March 31, 1936.  F. HAMILTON  2,035,805

OPHTHALMIC MOUNTING

Filed Sept. 14, 1933

FREDERICK HAMILTON
INVENTOR

BY *[signature]*
ATTORNEY

Patented Mar. 31, 1936

2,035,805

UNITED STATES PATENT OFFICE 2,035,805

OPHTHALMIC MOUNTING

Frederick Hamilton, Harmony, R. I., assignor to Bausch & Lomb Optical Company, Rochester, N. Y., a corporation of New York Application September 14, 1933, Serial No. 689,395

2 Claims. (Cl. 88—42)

This invention relates to ophthalmic mountings and more particularly it relates to such mountings as have rims for holding the lenses in place. One of the objects of my invention is to provide an improved mounting of the type described which will be neat in appearance and embody a structure which is relatively firm and rugged yet simple to manufacture. Another object is to provide improved means for holding together the ends of a split lens holding rim. These and other objects and advantages reside in certain novel features of construction, arrangement and combination of parts as will hereinafter be more fully described.

Referring to the drawing.

Figure 1:
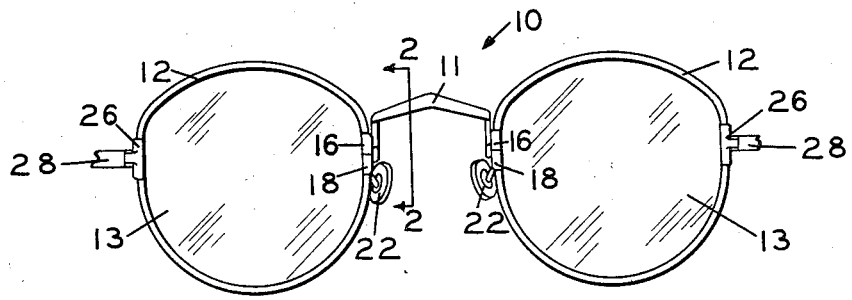
Fig. 1 is a front view of a spectacle frame embodying my invention.

A preferred embodiment of my invention is shown in the drawing wherein 10 indicates, generally, a spectacle frame comprising a bridge 11 connecting the two lens holding rims 12 which carry the lenses 13. The rim or eye wire 12 is split to provide the two adjacent ends 14 and 15. The member 16 is provided with a channel 17 in which the end 14 is secured, as by soldering, and member 18 is similarly provided with a channel 19 in which end 15 is secured.

Figure 2:
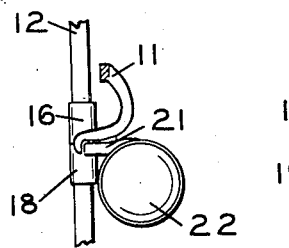
Fig. 2 is an enlarged fragmentary view taken on line 2—2.
Figure 4:
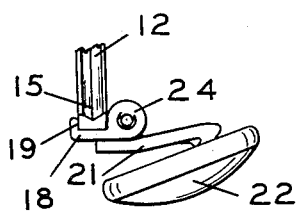
Figs. 4, 5 and 6 show the details for securing the eye wire to the parts.
Figure 5:
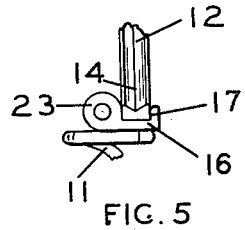
Figure 3:
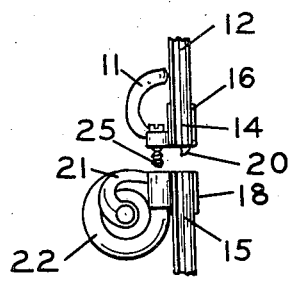
Fig. 3 shows the opposite side of the structure of Fig. 2 with parts in separated relation.
Figure 6:
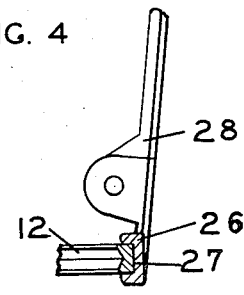

The lower ends of bridge 11 are soldered to the members 16 so that the end of the bridge extends downwardly below the end of the eye wire as shown at 20 in Fig. 3. Secured to member 18 is the arm 21 which extends laterally and carries on its free end the nose engaging pad 22. The arm is so positioned on member 18 that it abuts the end 20 of the bridge 11 as shown in Fig. 2. This affords strength and provides resistance to relative lateral movement of the two adjacent ends. Members 16 and 18 are provided with integral lugs 23 and 24, respectively, which receive the screw 25 that holds the adjacent ends together. Endpiece members 26 are also provided with channels 27 in which the eye wires 12 are secured. Temples 28 are pivotally mounted on members 26.

From the foregoing it will be apparent that I am able to attain the objects of my invention and provide a spectacle frame having improved means for securing the eye wire ends. A frame embodying my invention presents a neat appearance since the screw is not visible from the front side of the frame. The improved structure of the frame affords strength and stability besides greatly facilitating its manufacture. Various modifications can obviously be made without departing from the spirit of my invention.

I claim:

1. In an ophthalmic mounting the combination of a split lens rim having adjacent ends a bridge secured to said rim with a portion of said bridge projecting downwardly below one end of the rim, an arm secured to the other end of the rim, a nose engaging member carried by said arm, said arm being positioned in abutting relation to the projecting portion of said bridge and means for holding the ends of the rim together.

2. An ophthalmic mounting comprising a split lens holding rim having two adjacent ends, a member having a channel in which one of the ends is secured, a bridge secured to said member and having a projecting portion which extends below the end of the rim, a second member having a channel in which the other end is secured, an arm secured to said second member, a nose pad on said arm, said arm being positioned in abutting relation with the projecting portion on said bridge, lugs on the two members and screw means on said lugs for holding the ends of the rim together.

FREDERICK HAMILTON.